(12) United States Patent
Wu

(10) Patent No.: US 10,149,242 B2
(45) Date of Patent: Dec. 4, 2018

(54) ENERGY SAVING METHOD AND WAKEUP METHOD FOR WIRELESS ACCESS POINT, AND RELATED DEVICE AND SYSTEM

(71) Applicant: HUAWEI TECHNOLOGIES CO., LTD., Shenzhen, Guangdong (CN)

(72) Inventor: Jianming Wu, Reading (GB)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 51 days.

(21) Appl. No.: 15/357,848

(22) Filed: Nov. 21, 2016

(65) Prior Publication Data

US 2017/0070955 A1    Mar. 9, 2017

Related U.S. Application Data

(63) Continuation of application No. PCT/CN2014/080942, filed on Jun. 27, 2014.

(51) Int. Cl.
  *H04W 52/02* (2009.01)
  *H04B 17/318* (2015.01)
  (Continued)

(52) U.S. Cl.
  CPC ...... *H04W 52/0206* (2013.01); *H04B 17/318* (2015.01); *H04L 61/6022* (2013.01);
  (Continued)

(58) Field of Classification Search
  CPC ................................................ H04W 52/0206
  See application file for complete search history.

(56) References Cited

U.S. PATENT DOCUMENTS 7,741,977 B2 *   6/2010   Buchalo ............... G08G 1/0104
                                                                340/928
8,611,268 B1    12/2013   Thandaveswaran
                        (Continued)

FOREIGN PATENT DOCUMENTS

CN    102843220 A    12/2012
CN    102934397 A     2/2013
              (Continued)

OTHER PUBLICATIONS

Partial Supplementary European Search Report dated Mar. 6, 2017 for PCT/CN2014/080942.

*Primary Examiner* — Ayanah S George
(74) *Attorney, Agent, or Firm* — Womble Bond Dickinson (US) LLP

(57) ABSTRACT

Embodiments of the present invention disclose an energy saving method for a wireless AP, including: when it is detected that a time during which a wireless AP transmits no packet uplink or downlink and is associated with no station is greater than a preset time threshold, disabling, by the wireless AP, a transmit channel, and retaining only a receive channel; listening for, by the wireless AP, a Probe Request through the receive channel; and if the Probe Request obtained by listening meets a preset activation condition, enabling, by the wireless AP, the transmit channel. The embodiments of the present invention further disclose a wakeup method for a wireless AP and related devices. By means of the present invention, power consumption of a wireless AP can be effectively reduced.

9 Claims, 12 Drawing Sheets

(51) Int. Cl.
*H04L 29/12* (2006.01)
*H04W 12/08* (2009.01)
*H04W 24/08* (2009.01)

(52) U.S. Cl.
CPC ........... *H04W 12/08* (2013.01); *H04W 24/08* (2013.01); *H04W 52/02* (2013.01); *Y02D 70/00* (2018.01); *Y02D 70/142* (2018.01)

(56) References Cited

U.S. PATENT DOCUMENTS

| | | | |
|---|---|---|---|
| 2005/0154933 A1* | 7/2005 | Hsu | H04L 41/0806 713/320 |
| 2007/0294464 A1* | 12/2007 | Squires | G06F 1/266 711/100 |
| 2010/0296501 A1 | 11/2010 | Unbehaun | |
| 2011/0317600 A1* | 12/2011 | Thomson | H04B 1/005 370/311 |
| 2011/0319064 A1 | 12/2011 | Lenart et al. | |
| 2013/0097446 A1* | 4/2013 | Bernard | H04L 12/2834 713/323 |
| 2014/0071874 A1 | 3/2014 | Li et al. | |

FOREIGN PATENT DOCUMENTS

| | | |
|---|---|---|
| CN | 102948225 A | 2/2013 |
| JP | 2001156788 A | 6/2001 |
| JP | 2009033476 A | 2/2009 |
| WO | 2015196446 A1 | 12/2015 |

\* cited by examiner

ENERGY SAVING METHOD AND WAKEUP METHOD FOR WIRELESS ACCESS POINT, AND RELATED DEVICE AND SYSTEM

CROSS-REFERENCE TO RELATED APPLICATIONS

This application is a continuation of International Application No. PCT/CN2014/080942, filed on Jun. 27, 2014, which is hereby incorporated by reference in its entirety.

TECHNICAL FIELD

The present invention relates to the field of communications, and in particular, to an energy saving method and a wakeup method for a wireless AP, and a related device and system.

BACKGROUND

A wireless access point (AP) is an access point of a wireless network, and mainly includes devices that integrate routing, switching, and access and pure access point devices. An integrated device performs access and routing operations, and a pure access point device is only responsible for access of a wireless client. A pure access point device is generally used as an extension of a wireless network, and is connected to another AP or a main AP, so as to increase wireless coverage, and an integrated device is generally a core of a wireless network.

A wireless AP is an access point through which a user using a wireless device (a mobile device such as a mobile phone or a wireless device such as a notebook computer) accesses a wired network, and is mainly used in a home, a building, a school campus, and a park where a broadband network is installed and places that need wireless monitoring such as a warehouse and a factory. A typical distance of coverage is tens of meters to hundreds of meters. A wireless AP may also be used for long-distance transmission, and at present, the maximum distance may reach about 30 km, and the main technology is the IEEE802.11 series. Most wireless APs also have an access point client mode (AP client), and may be wirelessly connected to another AP, so as to extend coverage of a network.

Because of restriction of battery capacity of a station, in the prior art, energy saving measures are usually taken for the Station, so as to extend service time of the Station. However, there is no energy saving solution for a wireless AP.

SUMMARY

Embodiments of the present invention provide an energy saving method and a wakeup method for a wireless AP, and a related device, so as to effectively reduce power consumption of a wireless AP, and extend service time of the wireless AP.

According to a first aspect, an energy saving method for a wireless AP is provided, including:
when it is detected that a time during which a wireless AP transmits no packet uplink or downlink and is associated with no station is greater than a preset time threshold, disabling, by the wireless AP, a transmit channel, and retaining only a receive channel;
listening for, by the wireless AP, a Probe Request through the receive channel; and
if the Probe Request obtained by listening meets a preset activation condition, enabling, by the wireless AP, the transmit channel.

With reference to the first aspect, in a first possible implementation manner, the step of, if the Probe Request obtained by listening meets a preset activation condition, enabling, by the wireless AP, the transmit channel includes:
if the wireless AP detects a Probe Request through the receive channel, enabling, by the wireless AP, the transmit channel.

With reference to the first aspect, in a second possible implementation manner, the step of, if the Probe Request obtained by listening meets a preset activation condition, enabling, by the wireless AP, the transmit channel includes:
if the wireless AP detects a Probe Request, acquiring signal strength and/or a MAC address of the detected Probe Request; and
if the MAC address is in preset authorized device information and/or the signal strength is greater than a preset strength threshold, enabling, by the wireless AP, the transmit channel.

With reference to the second possible implementation manner of the first aspect, in a third possible implementation manner, before the step of, if the wireless AP detects a Probe Request, acquiring signal strength and/or a MAC address of the detected Probe Request, the method further includes:
configuring the authorized device information, where the authorized device information includes a list of MAC addresses of Stations allowed to wake up the wireless AP.

With reference to any one of the first aspect to the first to the third possible implementation manners of the first aspect, in a fourth possible implementation manner, before the step of, when it is detected that a time during which a wireless access point AP transmits no packet uplink or downlink and is associated with no station is greater than a preset time threshold, disabling, by the wireless AP, a transmit channel, and retaining only a receive channel, the method further includes:
configuring the preset time threshold, where the preset time threshold is equal to an integer (greater than 1) multiple of a beacon transmitting time interval of the wireless AP.

According to a second aspect, an energy saving method for a wireless AP is provided, including:
when it is detected that a time during which a wireless AP transmits no packet uplink or downlink and is associated with no station is greater than a preset time threshold, sending, by the wireless AP, a power-up instruction to a sniffer apparatus, where the power-up instruction is used to instruct the sniffer apparatus to power up; and
cutting off, by the wireless AP, power.

With reference to the second aspect, in a first possible implementation manner, the step of cutting off, by the wireless AP, power includes:
if a message for confirming that the sniffer apparatus is successfully power-up is received, performing the step of cutting off, by the wireless AP, power.

According to a third aspect, an embodiment of the present invention provides a wakeup method for a wireless AP, including:
after a sniffer apparatus receives a power-up instruction sent by a wireless AP, starting powering up;
listening for, by the sniffer apparatus, a Probe Request; and if the Probe Request obtained by listening meets a preset activation condition, after the sniffer apparatus instructs the wireless AP to power up, cutting off power.

With reference to the third aspect, in a first possible implementation manner, the step of, if the Probe Request obtained by listening meets a preset activation condition, after the sniffer apparatus instructs the wireless AP to power up, cutting off power includes:

if the sniffer apparatus detects a Probe Request, after the sniffer apparatus instructs the wireless AP to power up, cutting off power.

With reference to the third aspect, in a second possible implementation manner, the step of, if the Probe Request obtained by listening meets a preset activation condition, after the sniffer apparatus instructs the wireless AP to power up, cutting off power includes:

if the sniffer apparatus detects a Probe Request, acquiring signal strength and/or a MAC address of the detected Probe Request; and if the MAC address is in preset authorized device information and/or the signal strength is greater than a preset strength threshold, after the sniffer apparatus instructs the wireless AP to power up, cutting off power.

With reference to the second possible implementation manner, in a third possible implementation manner, before the step of, if the sniffer apparatus detects a Probe Request, acquiring signal strength and/or a MAC address of the detected Probe Request, the method further includes:

configuring the authorized device information, where the authorized device information includes a list of MAC addresses of Stations allowed to wake up the wireless AP.

According to a fourth aspect, an embodiment of the present invention provides a wireless AP, including:

a disabling module, configured to: if it is detected that a time during which no packet is transmitted uplink or downlink and no station is associated is greater than a preset time threshold, disable a transmit channel, and retain only a receive channel;

a first listening module, configured to listen for a Probe Request through the receive channel; and an enabling module, configured to: if the Probe Request obtained by listening meets a preset activation condition, enable the transmit channel.

With reference to the fourth aspect, in a first possible implementation manner, the enabling module is configured to: if a Probe Request is detected through the receive channel, enable the transmit channel.

With reference to the fourth aspect, in a second possible implementation manner, the enabling module includes:

an acquiring unit, configured to: if a Probe Request is detected, acquire signal strength and/or a MAC address of the detected Probe Request; and an enabling unit, configured to: if the MAC address is in preset authorized device information and/or the signal strength is greater than a preset strength threshold, enable the transmit channel.

With reference to the second possible implementation manner of the fourth aspect, in a third possible implementation manner, the wireless AP further includes:

a first configuration module, configured to configure the authorized device information, where the authorized device information includes a list of MAC addresses of Stations allowed to wake up the wireless AP.

With reference to the fourth aspect or any one of the first to the third possible implementation manners of the fourth aspect, in a fourth possible implementation manner, the wireless AP further includes:

a time threshold configuration module, configured to configure the preset time threshold, where the preset time threshold is equal to an integer (greater than 1) multiple of a beacon transmitting time interval of the wireless AP.

According to a fifth aspect, the present invention provides a wireless AP, including:

an instruction module, configured to: when it is detected that a time during which no packet is transmitted uplink or downlink and no station is associated is greater than a preset time threshold, send a power-up instruction to a sniffer apparatus, where the power-up instruction is used to instruct the sniffer apparatus to power up; and a power-off module, configured to cut off power.

With reference to the fifth aspect, in a first possible implementation manner, the wireless AP further includes:

a determining module, configured to: if a message for confirming that the sniffer apparatus is successfully power-up is received, instruct the power-off module to start to work.

According to a sixth aspect, an embodiment of the present invention provides a sniffer apparatus, including:

a receiving module, configured to: after a power-up instruction sent by a wireless AP is received, start powering up;

a second listening module, configured to listen for a Probe Request; and a power-up module, configured to: if the Probe Request obtained by listening meets a preset activation condition, after the wireless AP is instructed to power up, cut off power.

With reference to the sixth aspect, in a first possible implementation manner, if a Probe Request is detected, after the wireless AP is instructed to power up, power is cut off.

With reference to the sixth aspect, in a second possible implementation manner, the power-up module includes:

a detection unit, configured to: if a Probe Request is detected, acquire signal strength and/or a MAC address of the detected Probe Request; and a power-up unit, configured to: if the MAC address is in preset authorized device information and/or the signal strength is greater than a preset strength threshold, after the wireless AP is instructed to power up, cut off power.

With reference to the second possible implementation manner of the sixth aspect, in a third possible implementation manner, the sniffer apparatus further includes:

a second configuration module, configured to configure the authorized device information, where the authorized device information includes a list of MAC addresses of Stations allowed to wake up the wireless AP.

According to a seventh aspect, an embodiment of the present invention provides a wireless AP, including a processor and a memory, where the memory stores a set of program code, and the processor is configured to invoke the program code stored in the memory, to perform the following operations:

if it is detected that a time during which no packet is transmitted uplink or downlink and no station is associated is greater than a preset time threshold, disabling a transmit channel, and retaining only a receive channel;

listening for a Probe Request through the receive channel; and if the Probe Request obtained by listening meets a preset activation condition, enabling the transmit channel.

With reference to the seventh aspect, in a first possible implementation manner, the step, which is performed by the processor, of, if the Probe Request obtained by listening meets a preset activation condition, enabling the transmit channel includes:

if a Probe Request is detected through the receive channel, enabling the transmit channel.

With reference to the seventh aspect, in a second possible implementation manner, the step, which is performed by the processor, of, if the Probe Request obtained by listening meets a preset activation condition, enabling the transmit channel includes:

if a Probe Request is detected, acquiring signal strength and/or a MAC address of the detected Probe Request; and if the MAC address is in preset authorized device information and/or the signal strength is greater than a preset strength threshold, enabling the transmit channel.

With reference to the second possible implementation manner of the seventh aspect, in a third possible implementation manner, the processor is further configured to:

configure the authorized device information, where the authorized device information includes a list of MAC addresses of Stations allowed to wake up the wireless AP.

With reference to the seventh aspect or any one of the first to the third possible implementation manners of the seventh aspect, in a fourth possible implementation manner, the processor is further configured to:

configure the preset time threshold, where the preset time threshold is equal to an integer (greater than 1) multiple of a beacon transmitting time interval of the wireless AP.

According to an eighth aspect, an embodiment of the present invention provides a wireless AP, including a processor and a memory, where the memory stores a set of program code, and the processor is configured to invoke the program code stored in the memory, to perform the following operations:

when it is detected that no packet is transmitted uplink or downlink and no station is associated is greater than a preset time threshold, sending a power-up instruction to a sniffer apparatus, where the power-up instruction is used to instruct the sniffer apparatus to power up; and cutting off power.

With reference to the eighth aspect, in a first possible implementation manner, the processor is further configured to:

if a message for confirming that the sniffer apparatus is successfully power-up is received, performing the step of cutting off power.

According to a ninth aspect, an embodiment of the present invention provides a sniffer apparatus, including a processor and a memory, where the memory stores a set of program code, and the processor is configured to invoke the program code stored in the memory, to perform the following operations:

after a power-up instruction sent by a wireless AP is received, starting powering up;

listening for a Probe Request; and if the Probe Request obtained by listening meets a preset activation condition, after the wireless AP is instructed to power up, cutting off power.

With reference to the ninth aspect, in a first possible implementation manner, the step, which is performed by the processor, of, if the Probe Request obtained by listening meets a preset activation condition, after the wireless AP is instructed to power up, cutting off power includes:

if a Probe Request is detected, after the wireless AP is instructed to power up, cutting off power.

With reference to the ninth aspect, in a second possible implementation manner, the step, which is performed by the processor, of, if the Probe Request obtained by listening meets a preset activation condition, after the wireless AP is instructed to power up, cutting off power includes:

if a Probe Request is detected, acquiring signal strength and/or a MAC address of the detected Probe Request; and if the MAC address is in preset authorized device information and/or the signal strength is greater than a preset strength threshold, after the wireless AP is instructed to power up, cutting off power.

With reference to the second possible implementation manner of the ninth aspect, in a third possible implementation manner, the processor is further configured to:

configure the authorized device information, where the authorized device information includes a list of MAC addresses of Stations allowed to wake up the wireless AP.

According to a tenth aspect, an embodiment of the present invention provides a communications system, including: a wireless AP and a Station, where when it is detected that a time during which the wireless AP transmits no packet uplink or downlink and is associated with no station is greater than a preset time threshold, a transmit channel is disabled, and only a receive channel is retained;

the wireless AP listens to, through the receive channel, a Probe Request broadcast by the Station according to a preset interval; and if the Probe Request obtained by listening meets a preset activation condition, the wireless AP enables the transmit channel.

According to an eleventh aspect, an embodiment of the present invention provides a communications system, including: a wireless AP, a sniffer apparatus, and a Station, where when it is detected that a time during which the wireless AP transmits no packet uplink or downlink and is associated with no station is greater than a preset time threshold, the wireless AP sends a power-up instruction to the sniffer apparatus, and the wireless AP cuts off power;

after the sniffer apparatus receives the power-up instruction sent by the wireless AP, powering up is started;

the sniffer apparatus listens to a Probe Request, where the Probe Request is broadcast by the Station according to a preset interval; and if the Probe Request obtained by listening meets a preset activation condition, after the sniffer apparatus instructs the wireless AP to power up, power is cut off.

The implementation of the embodiments of the present invention has the following beneficial effects:

If a time during which a wireless AP transmits no packet uplink or downlink and is associated with no station is greater than a preset time threshold, a transmit channel of the wireless AP is disabled, and only a receive channel is retained, and the wireless AP enters a sleep state. The wireless AP determines, through a receive channel, that a Probe Request obtained by listening meets a preset activation condition, the transmit channel is enabled, and the wireless AP enters a normal state. In this way, power consumption of a wireless AP can be effectively reduced, and normal communication of the wireless AP is not affected.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
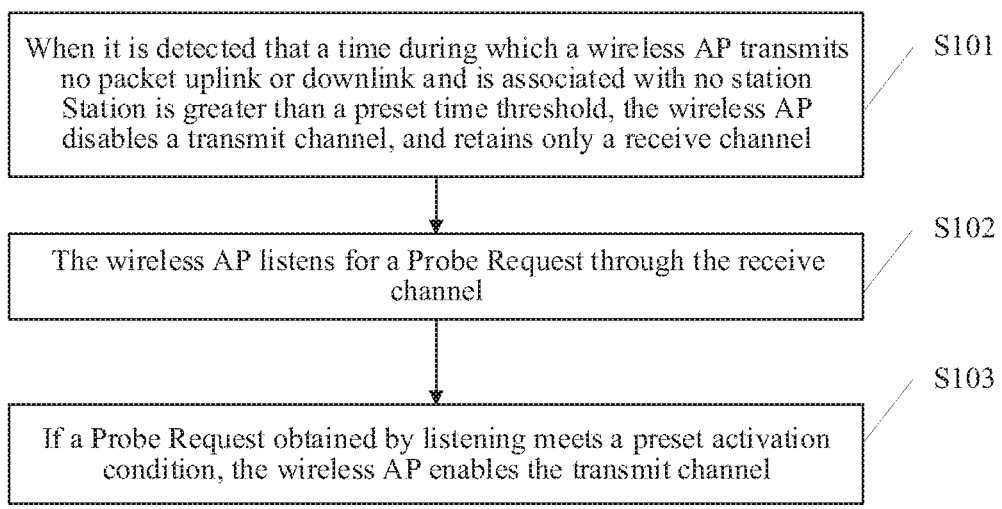
FIG. 1 is a schematic flowchart of an energy saving method for a wireless AP according to a first embodiment of the present invention.

Refer to FIG. 1, which is a schematic flowchart of an energy saving method for a wireless AP according to a first embodiment of the present invention. In this embodiment of the present invention, the method includes:

S101: When it is detected that a time during which a wireless AP transmits no packet uplink or downlink and is associated with no station is greater than a preset time threshold, the wireless AP disables a transmit channel, and retains only a receive channel.

Specifically, both the wireless AP and the Station in this embodiment of the present invention are a device supporting the 802.11 protocol. The Station periodically sends a broadcast probe request frame Probe Request on a channel in a list of channels supported by a network adapter, so as to scan a wireless network. After receiving the probe request frame, a wireless AP returns a probe response frame Probe Response to notify information about a wireless network provided by the wireless AP. The Station selects, according to the information about a wireless network in the Probe Response, a wireless AP having a strongest signal to form an association.

In an operation process of the wireless AP, when it is detected that no packet is transmitted uplink or downlink and no Station is associated, a timer is turned on to measure time. If the time during which no packet is transmitted uplink or downlink and no Station is associated exceeds the preset time threshold, the wireless AP disables the transmit channel, and retains only the receive channel. In this case, the wireless AP enters a sleep state, and only the receive channel is working. The wireless AP only needs to be provided with a quantity of electricity for maintaining normal operation of the receive channel of the wireless AP, and does not need to be provided with a quantity of electricity for maintaining normal operation of the transmit channel of the wireless AP; therefore, power consumption of the wireless AP can be effectively reduced.

It may be understood that, if the wireless AP has just completed a power-up process, the timer is started upon completion of power-up of the wireless AP. If it is detected that the time during which the wireless AP transmits no packet uplink or downlink and is associated with no Station exceeds the preset time threshold, the wireless AP disables the transmit channel, and retains only the receive channel.

For example, assuming that the wireless AP has been running for a period of time, and the preset time threshold is 5 minutes, when the wireless AP detects that no packet is transmitted uplink or downlink and no Station is associated, a current time point 10:36:00 is recorded, and the timer is turned on at the same time. If the time during which the wireless AP transmits no packet uplink or downlink and is associated with no Station exceeds the 5-minute time threshold, the wireless AP disables the transmit channel, and retains only the receive channel.

S102: The wireless AP listens to a Probe Request through the receive channel.

Specifically, the wireless AP listens to, through the retained receive channel, a Probe Request sent by a Station within coverage.

S103: If a Probe Request obtained by listening meets a preset activation condition, enable the transmit channel.

Specifically, to enable the wireless AP to switch from a sleep state to a normal state, the wireless AP determines whether the Probe Request obtained by listening in S102 meets the preset activation condition. If the Probe Request obtained by listening in S102 meets the preset activation condition, the wireless AP enables the transmit channel. In this case, both the transmit channel and the receive channel of the wireless AP are in an enabled state, and the wireless AP can normally communicate with a terminal in uplink and downlink directions.

It can be seen from the foregoing that, in the implementation of this embodiment of the present invention, if it is detected that a time during which a wireless AP transmits no packet uplink or downlink and is associated with no station is greater than a preset time threshold, the wireless AP disables a transmit channel, and retains only a receive channel. In this case, the wireless AP enters a sleep state. If the wireless AP determines, through the receive channel, that a Probe Request obtained by listening meets a preset activation condition, the transmit channel is enabled, and the wireless AP enters a normal state. In this way, power consumption of the wireless AP can be effectively reduced, and normal communication of the wireless AP is not affected.

Figure 2:
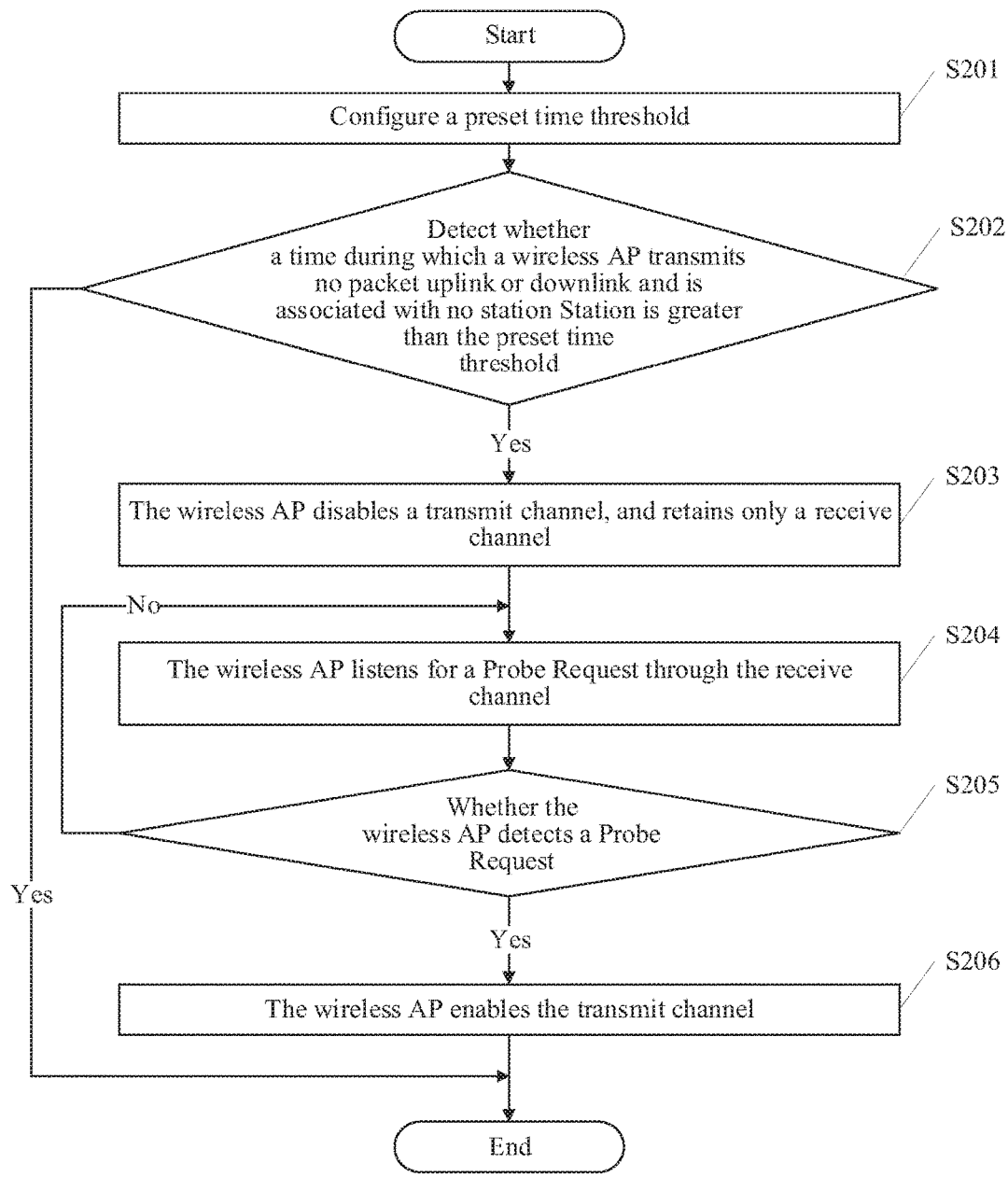
FIG. 2 is a schematic flowchart of an energy saving method for a wireless AP according to a second embodiment of the present invention.

Refer to FIG. 2, which is a schematic flowchart of an energy saving method for a wireless AP according to a second embodiment of the present invention. In this embodiment, the method includes:

S201: Configure a preset time threshold.

Specifically, a wireless AP configures the preset time threshold, and the time threshold is an integer (greater than 1) multiple of a beacon transmitting time interval of the wireless AP. For example, a Beacon transmitting time interval of the wireless AP is 50 ms, the configured time threshold is 100 times the time interval, that is, the configured time threshold is 50 s. A specific integer multiple needs to be set as required, and is not limited in the present invention.

S202: Detect whether a time during which a wireless AP transmits no packet uplink or downlink and is associated with no station is greater than the preset time threshold.

Specifically, both the wireless AP and the Station in this embodiment of the present invention are a device supporting the 802.11 protocol. The Station periodically sends a broadcast probe request frame Probe Request on a channel in a list of channels supported by a network adapter, so as to scan a wireless network. After receiving the probe request frame, a wireless AP returns a probe response frame Probe Response to notify information about a wireless network provided by the wireless AP. The Station selects, according to the information about a wireless network in the Probe Response, a wireless AP having a strongest signal to form an association and establish a communication connection. When the communication connection is established between the wireless AP and a Station within coverage, the wireless AP may add, to an association list, the Station to which the communication connection is established, and the wireless AP may determine, by querying the association list, whether the Station is associated.

If detecting that no packet is transmitted on a transmit channel or a receive channel and no Station is associated, the wireless AP starts a timer. If the time during which no packet is transmitted uplink or downlink and no station is associated is greater than the preset time threshold, S203 is performed, and otherwise the process is ended.

It may be understood that, if the wireless AP has just completed a power-up process, at the time of power-up, the wireless AP transmits no data uplink or downlink and is not associated with any Station, and the wireless AP turns on a timer. If the time during which the wireless AP transmits no packet uplink or downlink and is associated with no Station is greater than the preset time threshold, S203 is performed, and otherwise, the process is ended.

For example, assuming that the wireless AP has been running for a period of time, and the preset time threshold is 5 minutes, when the wireless AP detects that no packet is transmitted uplink or downlink and no Station is associated, the wireless AP starts the timer, and a current time point 10:36:00 is recorded. If the time during which no packet is transmitted uplink or downlink and no Station is associated exceeds the preset 5-minute time threshold, S203 is performed, and otherwise, the process is ended.

In this embodiment of the present invention, when the time during which the wireless AP meets both conditions of being associated with no Station and transmitting no packet uplink or downlink is greater than the preset time threshold, it indicates that the Station within the coverage of the wireless AP has no communication need. In this case, the wireless AP disables the transmit channel of the wireless AP, which does not affect normal communication of the Station within the coverage.

S203: The wireless AP disables a transmit channel, and retains only a receive channel.

Specifically, the wireless AP disables the transmit channel of the wireless AP, and retains only the receive channel of the wireless AP, and the wireless AP enters a sleep state. In this case, only the receive channel of the wireless AP is running, and the wireless AP only needs to be provided with a quantity of electricity for maintaining normal operation of the receive channel of the wireless AP; therefore, power consumption of the wireless AP can be effectively reduced.

S204: The wireless AP listens to a Probe Request through the receive channel.

Specifically, the wireless AP listens to, through the retained receive channel, the Probe Request sent by the Station within the coverage.

S205: Whether the wireless AP detects a Probe Request.

Specifically, if the wireless AP detects a Probe Request sent by any Station within the coverage, it indicates that the Station needs to initiate normal communication with the wireless AP, and S206 is performed, and otherwise, S204 is performed.

S206: The wireless AP enables the transmit channel of the wireless AP.

Specifically, when the wireless AP meets an activation condition of the detected Probe Request, the wireless AP enables the transmit channel of the wireless AP. In this case, both the transmit channel and the receive channel of the wireless AP are in a normal operation state.

For example, for a wireless AP deployed in a public place, a station to be served by the wireless AP is not limited, and the wireless AP needs to respond to a Probe Request sent by any Station within coverage. Once detecting a Probe Request sent by any Station, the wireless AP immediately enables the transmit channel of the wireless AP, and switches from a current sleep state to a normal state.

Optionally, when detecting the Probe Request, the wireless AP acquires signal strength of the detected Probe Request. If the signal strength is greater than the preset strength threshold, the wireless AP enables the transmit channel of the wireless AP, and otherwise, the wireless AP continues to detect the Probe Request. In this way, the wireless AP only provides a Station having high signal strength with a communication service, so as to provide the Station with desirable quality of service.

In this embodiment, only software of a wireless AP needs to be changed to complete the foregoing process, and hardware of the wireless AP does not need to be changed. When the wireless AP detects that a time during which no packet is transmitted uplink or downlink and no Station is associated is greater than a preset time threshold, a transmit channel of the wireless AP is disabled, and the wireless AP enters a sleep state. In this case, only a receive channel of the wireless AP is running. In this way, power consumption of the wireless AP can be reduced by about 50%. In addition, the wireless AP determines, by listening for a Probe Request through the receive channel, whether the transmit channel is enabled, so as to enter a normal state, and the wireless AP switches from a sleep state to a normal state at a high response speed, which does not affect normal communication of a Station within coverage of the wireless AP.

Figure 3:
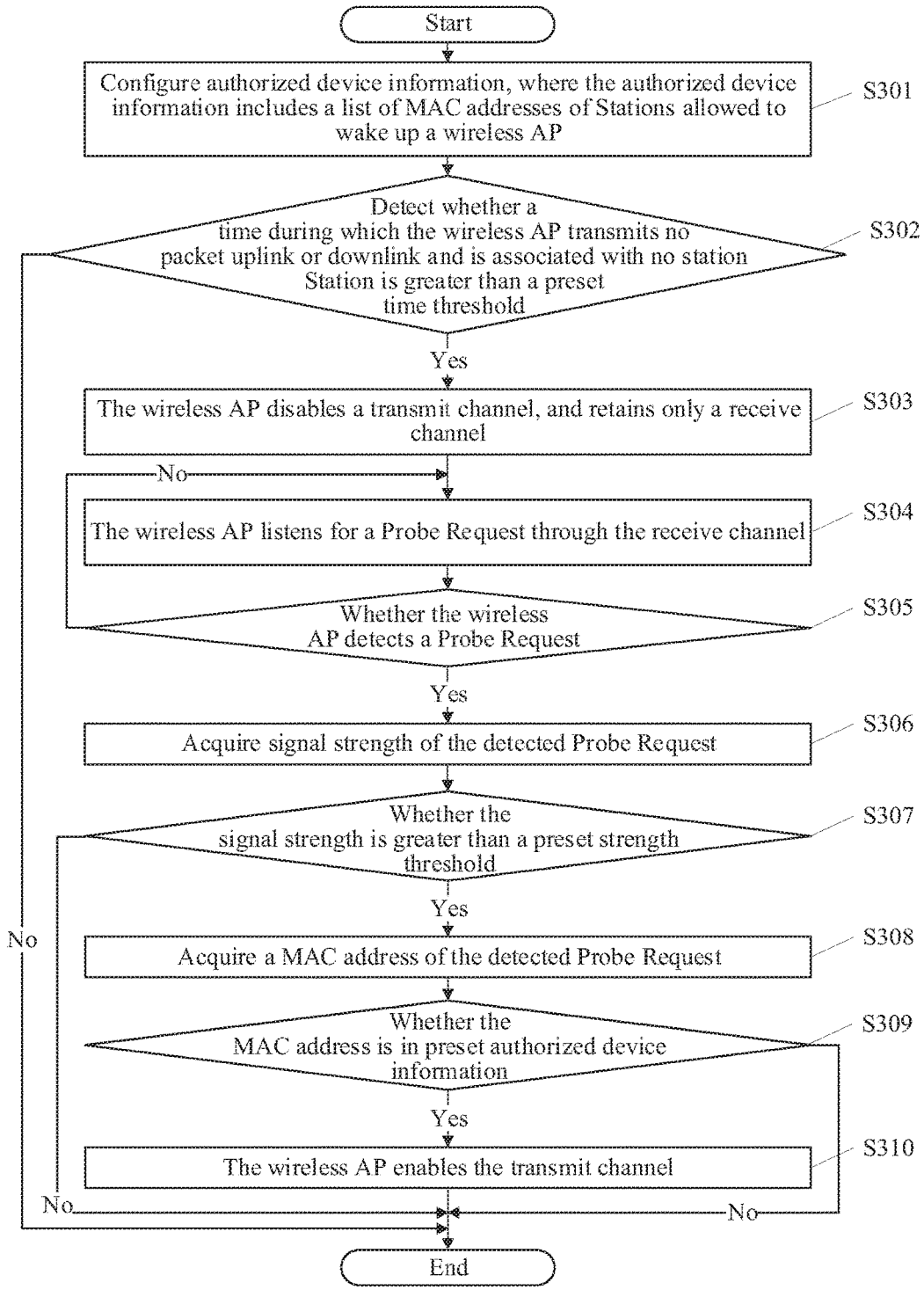
FIG. 3 is a schematic flowchart of an energy saving method for a wireless AP according to a third embodiment of the present invention.

Refer to FIG. 3, which is a schematic flowchart of an energy saving method for a wireless AP according to a third embodiment of the present invention. In this embodiment, the method includes:

S301: Configure authorized device information, where the authorized device information includes a list of MAC addresses of Stations allowed to wake up a wireless AP.

Specifically, the wireless AP is configured with the authorized device information, the authorized device information includes the list of MAC addresses of Stations allowed to wake up the wireless AP, the list of MAC addresses has features of being unique and unchangeable, and the wireless AP may perform wakeup right control on a Station by using the list of MAC addresses.

For example, the list of MAC addresses included in the authorized device information is: 05-16-DC-59-C2-34, 50-61-CD-59-2C-43, and 06-26-DC-69-C3-44, indicating that Stations corresponding to the list of 3 MAC addresses have the right to wake up the wireless AP.

S302: Detect whether a time during which the wireless AP transmits no packet uplink or downlink and is associated with no station is greater than a preset time threshold.

Specifically, both the wireless AP and the Station in this embodiment of the present invention are a device supporting the 802.11 protocol. The Station periodically sends a broadcast probe request frame Probe Request on a channel in a list of channels supported by a network adapter, so as to scan a wireless network. After receiving the probe request frame, a wireless AP returns a probe response frame Probe Response to notify information about a wireless network provided by the wireless AP. The Station selects, according to the information about a wireless network in the Probe Response, a wireless AP having a strongest signal to form an association and establish a communication connection. When the communication connection is established between the wireless AP and a Station within coverage, the wireless AP may add, to an association list, the Station to which the communication connection is established, and the wireless AP may determine, by querying the association list, whether the Station is associated.

If detecting that no packet is transmitted on a transmit channel or a receive channel and no Station is associated, the wireless AP starts a timer. If the time during which no packet is transmitted uplink or downlink and no Station is associated is greater than the preset time threshold, S303 is performed, and otherwise, the process is ended.

It may be understood that, if the wireless AP has just completed a power-up process, at the time of power-up, the wireless AP transmits no data uplink or downlink and is not associated with any Station, and the wireless AP starts a timer. If the time during which the wireless AP transmits no packet uplink or downlink and is associated with no Station is greater than the preset time threshold, S303 is performed, and otherwise, the process is ended.

For example, assuming that the wireless AP has been running for a period of time, and the preset time threshold is 5 minutes, when detecting that no packet is transmitted uplink or downlink and no Station is associated, the wireless AP starts the timer, and a current time point 10:36:00 is recorded. If the time during which no packet is transmitted uplink or downlink and no Station is associated exceeds the preset 5-minute time threshold, S303 is performed, and otherwise, the process is ended.

In this embodiment of the present invention, when the time during which the wireless AP meets both conditions of being associated with no Station and transmitting no packet uplink or downlink is greater than the preset time threshold, it indicates that the Station within the coverage of the wireless AP has no communication need. In this case, the wireless AP disables the transmit channel of the wireless AP, which does not affect normal communication of the Station within the coverage.

S303: The wireless AP disables a transmit channel, and retains only a receive channel.

Specifically, the wireless AP disables the transmit channel of the wireless AP, and retains only the receive channel of the wireless AP. In this case, the wireless AP enters a sleep state, and only the receive channel of the wireless AP is running. The wireless AP only needs to be provided with a quantity of electricity for maintaining normal operation of the receive channel of the wireless AP, which effectively reduces power consumption of the wireless AP.

S304: The wireless AP listens to a Probe Request through the receive channel.

Specifically, the wireless AP listens to, through the retained receive channel, the Probe Request sent by the Station within the coverage.

S305: Whether the wireless AP detects a Probe Request.

Specifically, if the wireless AP detects a Probe Request sent by any Station within the coverage, it indicates that the Station needs to initiate normal communication with the wireless AP, and S306 is performed, and otherwise, S304 is performed.

S306: Acquire signal strength of the detected Probe Request.

Specifically, the wireless AP acquires an RSSI value of the detected Probe Request. The RSSI value indicates the signal strength of the Probe Request. A greater RSSI value indicates higher signal strength, and a smaller RSSI value indicates lower signal strength.

S307: Whether the signal strength is greater than a preset strength threshold.

Specifically, if the wireless AP determines that the signal strength of the detected Probe Request is greater than the preset strength threshold, S309 is performed, and otherwise, the process is ended.

S308: Acquire a MAC address of the detected Probe Request.

Specifically, the Probe Request sent by the Station carries the MAC address of the Probe Request, and after receiving the Probe Request, the wireless AP extracts, from the Probe Request, a MAC address of the Station sending the Probe Request.

S309: Whether the MAC address is in preset authorized device information.

Specifically, the wireless AP determines whether the extracted MAC address is in the preset authorized device information in S301, and if the extracted MAC address is in the preset authorized device information in S301, S310 is performed, and otherwise, the process is ended.

For example, a list of MAC addresses, which is extracted by the wireless AP, in the received Probe Request is 05-16-DC-59-C2-34, the list of MAC addresses exists in the authorized device information configured in S301, which indicates that a Station corresponding to the list of MAC addresses has the right to wake up the wireless AP.

S310: The wireless AP enables the transmit channel.

Specifically, when meeting the activation condition that the signal strength of the detected Probe Request is greater than the preset strength threshold and the list of MAC addresses is in the preset authorized device information, the wireless AP enables the transmit channel of the wireless AP. In this case, both the transmit channel and the receive channel of the wireless AP are in a normal operation state, and the wireless AP can normally communicate with the Station within the coverage.

For example, for a wireless AP deployed in a private place, the wireless AP restricts wakeup by a Station within coverage. When detecting that the signal strength of the received Probe Request is greater than the preset strength threshold and the Station sending the Probe Request has a wakeup right, the wireless AP immediately enables the transmit channel of the wireless AP, and the wireless AP switches from a current sleep state to a normal state. In this way, the wireless AP can provide the Station with a high quality communication service, and avoid being woken up by a Station having no wakeup right by mistake.

In some embodiments of the present invention, in a scenario in which a Station does not have a high requirement for quality of service, the wireless AP does not need to determine the signal strength of the Probe Request, and it only needs to be determined whether the MAC address of the Probe Request is in the preset authorized device information, and if the MAC address of the Probe Request is in the present authorized device information, the wireless AP enables the transmit channel of the wireless AP.

In this embodiment, only software of a wireless AP needs to be changed to complete the foregoing process, and hardware of the wireless AP does not need to be changed. When the wireless AP detects that a time during which no packet is transmitted uplink or downlink and no Station is associated is greater than a preset time threshold, a transmit channel of the wireless AP is disabled, and the wireless AP enters a sleep state. In this case, only a receive channel of the wireless AP is running. In this way, power consumption of the wireless AP can be reduced by about 50%. In addition, the wireless AP determines, by listening for a Probe Request through the receive channel, whether the transmit channel is enabled, so as to enter a normal state, and the wireless AP switches from a sleep state to a normal state at a high response speed, which does not affect normal communication of a Station within coverage of the wireless AP.

Figure 4:
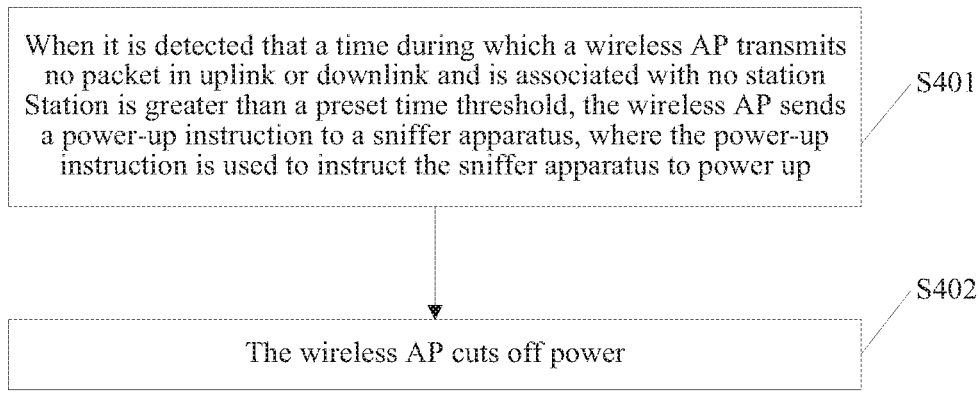
FIG. 4 is a schematic flowchart of an energy saving method for a wireless AP according to a fourth embodiment of the present invention.

Refer to FIG. 4, which is a schematic flowchart of an energy saving method for a wireless AP according to a fourth embodiment of the present invention. In this embodiment, the method includes:

S401: When it is detected that a time during which a wireless AP transmits no packet uplink or downlink and is associated with no station is greater than a preset time threshold, the wireless AP sends a power-up instruction to a sniffer apparatus, where the power-up instruction is used to instruct the sniffer apparatus to power up.

Specifically, both the wireless AP and the Station in this embodiment of the present invention are a device supporting the 802.11 protocol. The Station periodically sends a broadcast probe request frame Probe Request on a channel in a list of channels supported by a network adapter, so as to scan a wireless network. After receiving the probe request frame, a wireless AP returns a probe response frame Probe Response to notify information about a wireless network provided by the wireless AP. The Station selects, according to the information about a wireless network in the Probe Response, a wireless AP having a strongest signal to form an association.

In an operation process of the wireless AP, when detecting that no packet is transmitted uplink or downlink and no Station is associated, the wireless AP starts a timer. If the a time during which no packet is transmitted uplink or downlink and no Station is associated is greater than the preset time threshold, the wireless AP sends the power-up instruction to the sniffer apparatus, where the power-up instruction is used to instruct the sniffer apparatus to power up.

It may be understood that, if the wireless AP has just completed a power-up process, at the time of power-up, the wireless AP transmits no data uplink or downlink and is not associated with any Station, and the wireless AP starts a timer. If the time during which no packet is transmitted uplink or downlink and no station is associated is greater than the preset time threshold, the wireless AP sends the power-up instruction to the sniffer apparatus, so as to instruct the sniffer apparatus to start powering up.

For example, assuming that the wireless AP has been running for a period of time, and the preset time threshold is 5 minutes, when the wireless AP detects that no packet is transmitted uplink or downlink and no station is associated, the wireless AP turns on the timer, and a current time point 10:36:00 is recorded. If a recorded time of the timer exceeds the preset 5-minute time threshold, the wireless AP sends the power-up instruction to the sniffer apparatus, and the sniffer apparatus receives the power-up instruction, is connected to a power supply, and starts to power up.

S402: The wireless AP cuts off power.

Specifically, after instructing the sniffer apparatus to start powering up, the wireless AP cuts off power. In this case, the wireless AP is in a power-off state, the wireless AP does not consume any electric power, and only the sniffer apparatus consumes electric power, so that power consumption of the wireless AP may be effectively reduced.

It should be noted that, the sniffer apparatus may be located in the wireless AP and integrated to the wireless AP, or may be an independent component separate from the wireless AP. Preferably, a low power consumption element may be used in the sniffer apparatus, so that power consumption in operation can be further reduced.

It can be seen from the foregoing that, in the implementation of this embodiment of the present invention, when it is detected that a time during which a wireless AP transmits no packet uplink or downlink and is associated with no station is greater than a preset time threshold, the wireless AP instructs a sniffer apparatus to start to perform a power-up operation, and cuts off power of the wireless AP. In this way, the wireless AP does not consume any electric power, and only the sniffer apparatus consumes electric power, so that power consumption can be greatly reduced.

Figure 5:
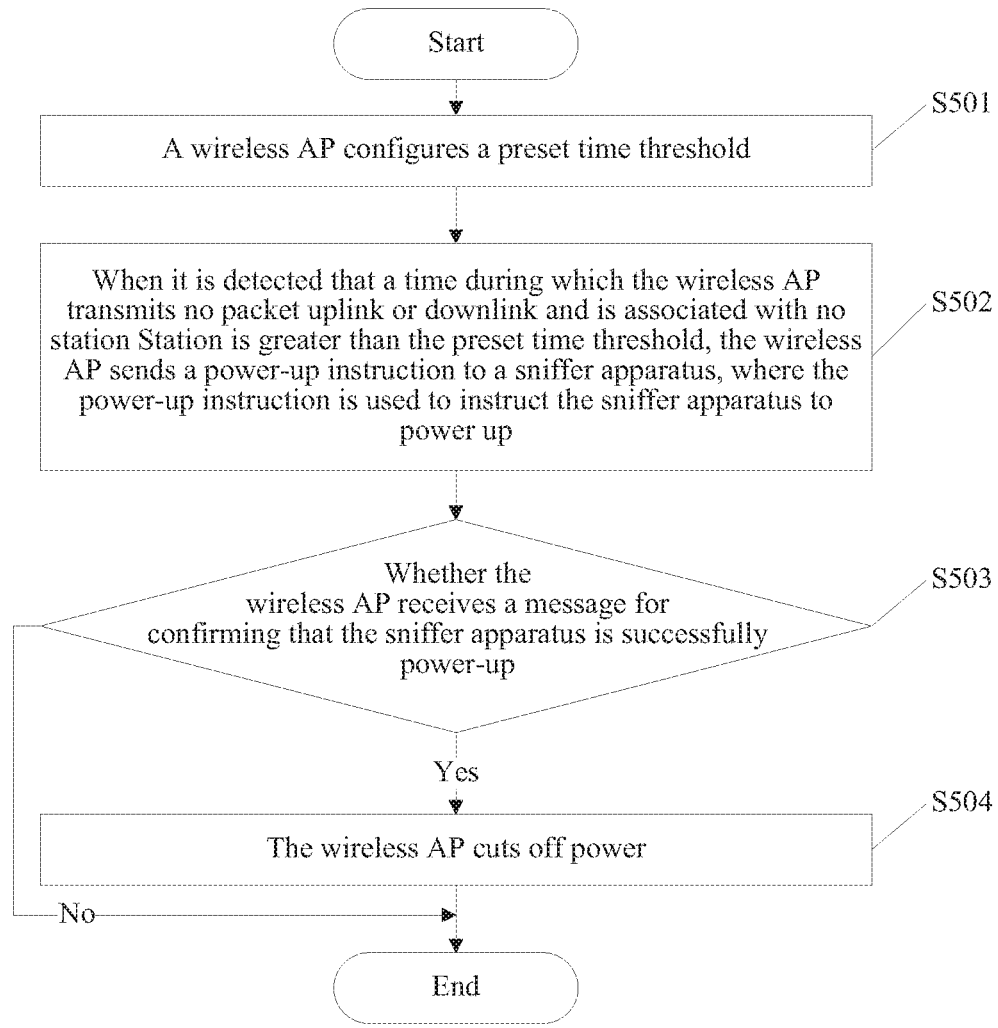
FIG. 5 is a schematic flowchart of an energy saving method for a wireless AP according to a fifth embodiment of the present invention.

Refer to FIG. 5, which is a schematic flowchart of an energy saving method for a wireless AP according to a fifth embodiment of the present invention. In this embodiment, the method includes:

S501: A wireless AP configures a preset time threshold.

Specifically, the wireless AP configures the preset time threshold, and the time threshold is an integer (greater than 1) multiple of a beacon transmitting time interval of the wireless AP. For example, a Beacon transmitting time interval of the wireless AP is 50 ms, the configured time threshold is 100 times the time interval, that is, the configured time threshold is 50 s. A specific integer multiple needs to be set as required, and is not limited in the present invention.

S502: When it is detected that a time during which the wireless AP transmits no packet uplink or downlink and is associated with no station is greater than the preset time threshold, the wireless AP sends a power-up instruction to a sniffer apparatus, where the power-up instruction is used to instruct the sniffer apparatus to power up.

Specifically, both the wireless AP and the Station in this embodiment of the present invention are a device supporting the 802.11 protocol. The Station periodically sends a broadcast probe request frame Probe Request on a channel in a list of channels supported by a network adapter, so as to scan a wireless network. After receiving the probe request frame, a wireless AP returns a probe response frame Probe Response to notify information about a wireless network provided by the wireless AP. The Station selects, according to the information about a wireless network in the Probe Response, a wireless AP having a strongest signal to form an association.

In an operation process of the wireless AP, when detecting that no packet is transmitted uplink or downlink and no Station is associated, the wireless AP starts a timer. If the time during which no packet is transmitted uplink or downlink and no Station is associated is greater than the preset time threshold, the wireless AP sends the power-up instruction to the sniffer apparatus, where the power-up instruction is used to instruct the sniffer apparatus to power up.

It may be understood that, if the wireless AP has just completed a power-up process, at the time of power-up, the wireless AP transmits no data uplink or downlink and is not associated with any Station, and the wireless AP starts a timer. If the time during which no packet is transmitted uplink or downlink and no station is associated is greater than the preset time threshold, the wireless AP sends the power-up instruction to the sniffer apparatus, so as to instruct the sniffer apparatus to start powering up.

For example, assuming that the wireless AP has been running for a period of time, and the preset time threshold is 5 minutes, when detecting that no packet is transmitted uplink or downlink and no station is associated, the wireless AP turns on the timer, and a current time point 10:36:00 is recorded. If a recorded time of the timer exceeds the preset 5-minute time threshold, the wireless AP sends the power-up instruction to the sniffer apparatus, and the sniffer apparatus receives the power-up instruction, is connected to a power supply, and starts to power up.

S503: Whether the wireless AP receives a message for confirming that the sniffer apparatus is successfully power-up.

Specifically, after receiving the power-up instruction sent by the wireless AP, the sniffer apparatus is power-up. After being power-up, the sniffer apparatus sends, to the wireless AP, a confirmation message indicating that the sniffer apparatus is successfully power-up. The wireless AP determines whether the confirmation message is received, and if the confirmation message is received, S504 is performed, and otherwise, the process is ended.

S504: The wireless AP cuts off power.

Specifically, after receiving the confirmation message, the wireless AP determines that the sniffer apparatus is successfully power-up. In this case, the wireless AP cuts off power of the wireless AP, the wireless AP is in a power-off state, the wireless AP does not consume any electric power, and only the sniffer apparatus consumes electric power, so that power consumption may be effectively reduced.

It should be noted that, the sniffer apparatus may be located in the wireless AP and integrated to the wireless AP, or may be an independent component separate from the wireless AP. Preferably, a low power consumption element may be used in the sniffer apparatus, so that power consumption in operation can be further reduced.

It can be seen from the foregoing that, in the implementation of this embodiment of the present invention, when it is detected that a time during which a wireless AP transmits no packet uplink or downlink and is associated with no station is greater than a preset time threshold, the wireless AP instructs a sniffer apparatus to start to perform a power-up operation, and cuts off power of the wireless AP. In this way, the wireless AP does not consume any electric power, and only the sniffer apparatus consumes electric power, so that power consumption can be greatly reduced.

Figure 6:
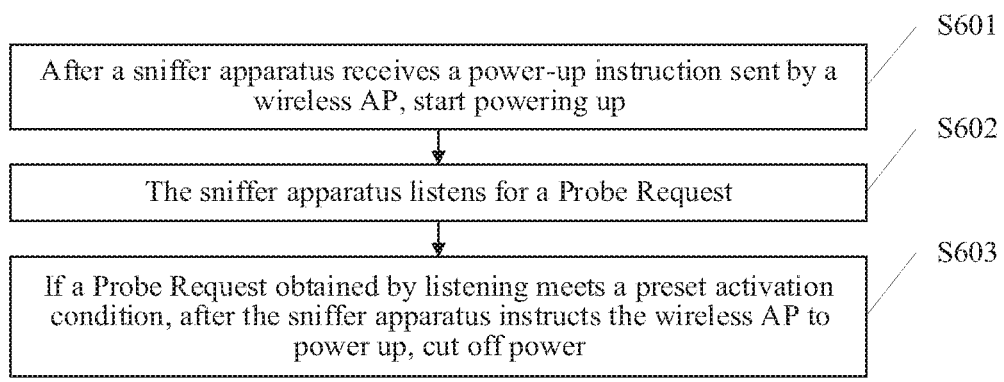
FIG. 6 is a schematic flowchart of a wakeup method for a wireless AP according to a first embodiment of the present invention.

Refer to FIG. 6, which is a schematic flowchart of a wakeup method for a wireless AP according to a first embodiment of the present invention. In this embodiment, the method includes:

S601: After a sniffer apparatus receives a power-up instruction sent by a wireless AP, start powering up.

Specifically, before the power-up instruction is received, the sniffer apparatus is in a power-off state, and does not consume any electric power. The wireless AP sends the power-up instruction to the sniffer apparatus to drive a power switch of the sniffer apparatus to switch from an enabled state to a disabled state. In this way, the sniffer apparatus can be power-up. For example, the power switch of the sniffer apparatus may be implemented by a relay. After the sniffer apparatus receives the power-up instruction, a normally enable contact of the relay is disabled, so that the sniffer apparatus starts to power up.

S602: The sniffer apparatus listens to a Probe Request.

S603: If a Probe Request obtained by listening meets a preset activation condition, after the sniffer apparatus instructs the wireless AP to power up, cut off power.

Specifically, the sniffer apparatus determines whether the Probe Request obtained by listening meets the preset activation condition, and if the Probe Request obtained by listening meets the preset activation condition, the sniffer apparatus sends a pulse signal to the wireless AP to drive the power switch of the wireless AP to switch from an enabled state to a disabled state. In this way, the wireless AP is power-up. After the wireless AP is power-up, the wireless AP can perform normal communication after being associated with a Station within coverage. After the sniffer apparatus instructs the wireless AP to power up, the sniffer apparatus cuts off power of the sniffer apparatus. In this case, the sniffer apparatus is in a power-off state, and no longer consumes any electric power.

In implementation of this embodiment of the present invention, after receiving a power-up instruction sent by a wireless AP, a sniffer apparatus starts to power up. If a Probe Request obtained by listening by the sniffer apparatus meets a preset activation condition, the wireless AP is instructed to power up, so that the wireless AP communicates with a Station within coverage, and the sniffer apparatus then cuts off power of the sniffer apparatus. In this way, power consumption of the wireless AP can be effectively reduced, and normal communication needs of the wireless AP are not affected.

Figure 7:
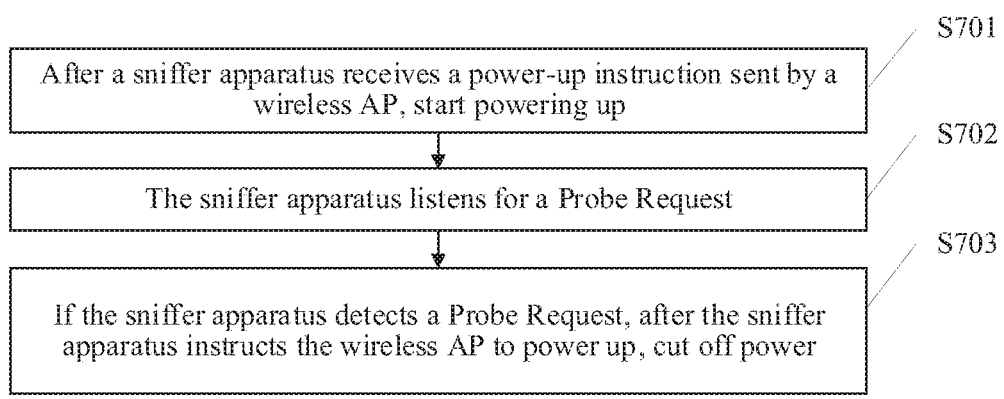
FIG. 7 is a schematic flowchart of a wakeup method for a wireless AP according to a second embodiment of the present invention.

Refer to FIG. 7, which is a schematic flowchart of a wakeup method for a wireless AP according to a second embodiment of the present invention. In this embodiment of the present invention, the method includes:

S701: After a sniffer apparatus receives a power-up instruction sent by a wireless AP, start powering up.

Specifically, before the power-up instruction is received, the sniffer apparatus is in a power-off state, and does not consume any electric power. The wireless AP sends the power-up instruction to the sniffer apparatus to drive a power switch of the sniffer apparatus to switch from an enabled state to a disabled state. In this way, the sniffer apparatus can be power-up. For example, the power switch of the sniffer apparatus may be implemented by a relay. After the sniffer apparatus receives the power-up instruction, a normally enabled contact of the relay is disabled, so that the sniffer apparatus starts to power up.

S702: The sniffer apparatus listens to a Probe Request.

S703: If the sniffer apparatus detects a Probe Request, after the sniffer apparatus instructs the wireless AP to power up, cut off power.

Specifically, if the sniffer apparatus detects a Probe Request sent by any Station, it indicates that the Station needs to initiate normal communication with the wireless AP. When determining that an activation condition of the detected Probe Request is met, the sniffer apparatus instructs the wireless AP to power up. After the wireless AP has been power-up, both a transmit channel and a receive channel of the wireless AP are in a normal operation state, and the sniffer apparatus then cuts off power of the sniffer apparatus.

For example, for a wireless AP deployed in a public place, a Station to be served by the wireless AP is not limited, and the wireless AP needs to respond to a Probe Request sent by any Station within coverage. Once detecting a Probe Request sent by any Station, the sniffer apparatus instructs the wireless AP to power up. After the wireless AP has been power-up, the sniffer apparatus cuts off power of the sniffer apparatus, and in this way, the wireless AP switches from a current power-off state to a normal state.

Optionally, the sniffer apparatus detects a Probe Request and acquires signal strength of the detected Probe Request, and if the signal strength is greater than a preset strength threshold, after instructing the wireless AP to power up, the sniffer apparatus cuts off power of the sniffer apparatus, and otherwise, the sniffer apparatus continues to detect a Probe Request. In this way, the wireless AP only provides a Station having high signal strength with a communication service, so as to provide the Station with desirable quality of service.

Figure 8:
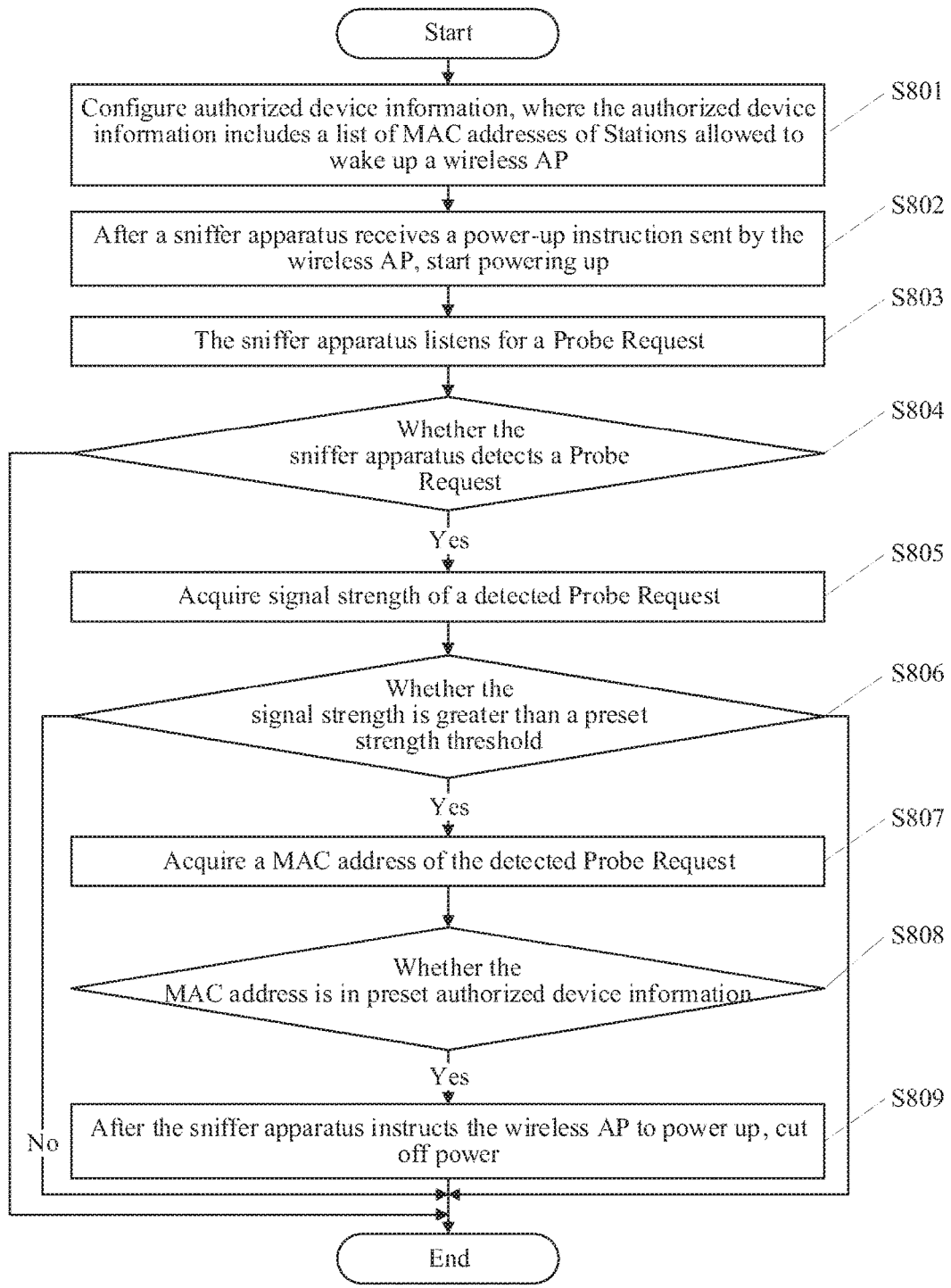
FIG. 8 is a schematic flowchart of a wakeup method for a wireless AP according to a third embodiment of the present invention.

Refer to FIG. 8, which is a schematic flowchart of a wakeup method for a wireless AP according to a third embodiment of the present invention. In this embodiment of the present invention, the method includes:

S801: Configure authorized device information, where the authorized device information includes a list of MAC addresses of Stations allowed to wake up a wireless AP.

Specifically, the authorized device information is configured in the sniffer apparatus, the authorized device information includes the list of MAC addresses of the station having a right to wake up the wireless AP, the list of MAC addresses has features of being unique and unchangeable, and the sniffer apparatus may perform wakeup control on the wireless AP by using the list of MAC addresses.

For example, the list of MAC addresses included in the authorized device information is: 05-16-DC-59-C2-34, 50-61-CD-59-2C-43, and 06-26-DC-69-C3-44, indicating that Stations corresponding to the list of 3 MAC addresses have the right to wake up the wireless AP.

S802: After a sniffer apparatus receives a power-up instruction sent by the wireless AP, start powering up.

S803: The sniffer apparatus listens to a Probe Request.

S804: Whether the sniffer apparatus detects a Probe Request. If the sniffing apparatus detects the Probe Request, S508 is performed, and otherwise, the process is ended.

S805: Acquire signal strength of the detected Probe Request.

S806: Whether the signal strength is greater than a preset strength threshold.

S807: Acquire a MAC address of the detected Probe Request.

S808: Whether the MAC address is in the preset authorized device information.

S809: After the sniffer apparatus instructs the wireless AP to power up, cut off power.

Specifically, when the sniffer apparatus meets an activation condition that the signal strength of the detected Probe Request is greater than the preset strength threshold and the MAC address is in the preset authorized device information, the sniffer apparatus instructs the wireless AP to power up. After the wireless AP has been power-up, the sniffer apparatus cuts off power of the sniffer apparatus. In this case, both a transmit channel and a receive channel of the wireless AP are in a normal operation state.

For example, for a wireless AP deployed in a private place, the wireless AP restricts wakeup by a Station within coverage. When detecting that the signal strength of the received Probe Request is strong enough and the Station sending the Probe Request has a wakeup right, the sniffer apparatus immediately instructs the wireless AP to power up, the sniffer apparatus then cuts off power of the sniffer apparatus, and the wireless AP switches from a current power-off state to a normal state, provides the Station with a high quality communication service, and avoids being woken up by a Station having no wakeup right by mistake.

In implementation of this embodiment of the present invention, after receiving a power-up instruction sent by a wireless AP, a sniffer apparatus starts to power up. If a Probe Request obtained by listening by the sniffer apparatus meets a preset activation condition, the wireless AP is instructed to power up, so that the wireless AP communicates with a Station within coverage, and the sniffer apparatus then cuts off power of the sniffer apparatus. In this way, power consumption of the wireless AP can be effectively reduced, and normal communication needs of the wireless AP are not affected.

Figure 9:
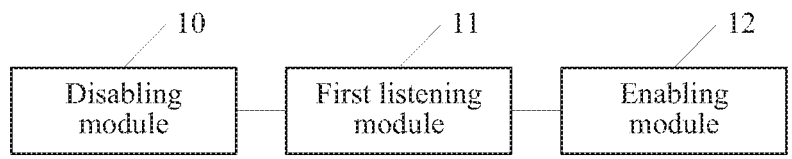
FIG. 9 is a schematic structural diagram of a wireless AP according to a first embodiment of the present invention.

Refer to FIG. 9, which is a schematic structural diagram of a wireless AP according to a first embodiment of the present invention. In this embodiment, the wireless AP includes a disabling module 10, a first listening module 11, and an enabling module 12.

The disabling module 10 is configured to: if a time during which no packet is transmitted uplink or downlink and no station is associated is greater than a preset time threshold, disable a transmit channel, and retain only a receive channel.

The disabling module 10 is configured to: if it is detected that the time during which no packet is transmitted uplink or downlink and no station is associated is greater than the preset time threshold, disable the transmit channel, and retain only the receive channel.

The first listening module 11 is configured to listen for a Probe Request through the receive channel.

The enabling module 12 is configured to: if the Probe Request obtained by listening meets a preset activation condition, enable the transmit channel.

This embodiment of the present invention belongs to a same idea as the method embodiment in FIG. 1, and technical effects brought by this embodiment of the present invention are also the same as those of the method embodiment in FIG. 1. For a specific process, refer to the descriptions of the method embodiment in FIG. 1, which is not described herein again.

Figure 10:
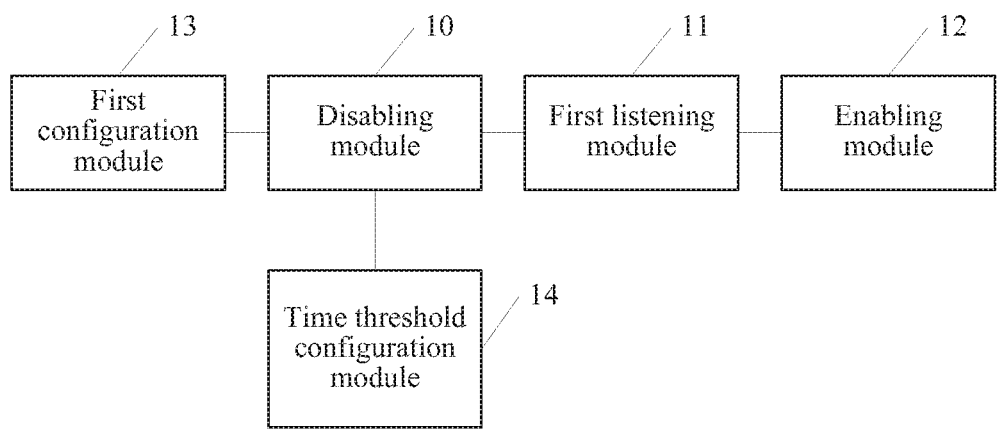
FIG. 10 is a schematic structural diagram of a wireless AP according to a second embodiment of the present invention.
Figure 11:
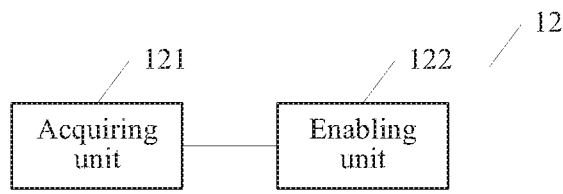
FIG. 11 is a schematic structural diagram of an enabling module in FIG. 10.

Refer to FIG. 10 and FIG. 11, which are schematic structural diagrams of a wireless AP according to a second embodiment of the present invention. In this embodiment of the present invention, besides including a disabling module 10, a first listening module 11, and an enabling module 12, the wireless AP further includes: a first configuration module 13 and a time threshold configuration module 14.

The first configuration module 13 is configured to configure authorized device information, where the authorized device information includes a list of MAC addresses of Stations allowed to wake up the wireless AP.

The time threshold configuration module 14 is configured to configure the preset time threshold, where the preset time threshold is equal to an integer (greater than 1) multiple of a beacon transmitting time interval of the wireless AP.

Optionally, the enabling module 12 is configured to: if a Probe Request is detected through the receive channel, enable a transmit channel.

Optionally, the enabling module 12 includes an acquiring unit 121 and an enabling unit 122.

The acquiring unit 121 is configured to: if a Probe Request is detected, acquire signal strength and/or a MAC address of the detected Probe Request.

The enabling unit 122 is configured to: if the MAC address is in preset authorized device information and/or the signal strength is greater than a preset strength threshold, enable the transmit channel.

This embodiment of the present invention belongs to a same idea as the method embodiments in FIG. 2 and FIG. 3, and technical effects brought by this embodiment of the present invention are also the same as those of the method embodiments in FIG. 2 and FIG. 3. For details, refer to the descriptions of the method embodiments in FIG. 2 and FIG. 3, which are not described herein again.

Figure 12:
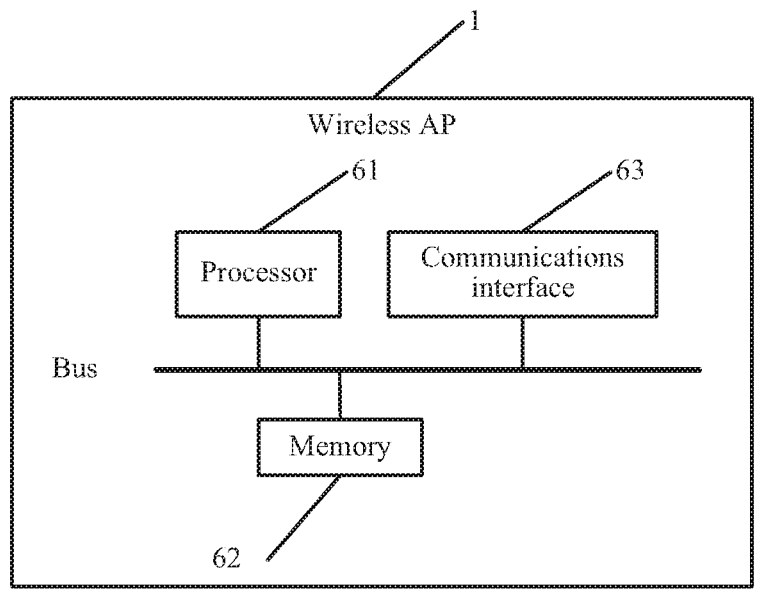
FIG. 12 is a schematic structural diagram of a wireless AP according to a third embodiment of the present invention.

Refer to FIG. 12, which is a schematic structural diagram of a wireless AP according to a third embodiment of the present invention. In this embodiment, the wireless AP 1 includes a processor 61, a memory 62, and a communications interface 63. The communications interface 63 is configured to communicate with an external device, there may be one or more processors 61 in the wireless AP 1, and an example of one processor is used in FIG. 12. In some embodiments of the present invention, the processor 61, the memory 62, and the communications interface 63 may be connected through a bus or in another manner, and an example in which the processor 61, the memory 62, and the communications interface 63 are connected through a bus is used in FIG. 12.

The memory 62 stores a set of program code, and the processor 61 is connected to invoke the program code stored in the memory 62, to perform the following operations:

if it is detected that a time during which no packet is transmitted uplink or downlink and no station is associated is greater than a preset time threshold, disabling a transmit channel, and retaining only a receive channel;

listening for a Probe Request through the receive channel; and if the Probe Request obtained by listening meets a preset activation condition, enabling the transmit channel.

In some embodiments of the present invention, the step, performed by the processor 61, of, if the Probe Request obtained by listening meets a preset activation condition, enabling the transmit channel includes:

if a Probe Request is detected through the receive channel, enabling the transmit channel.

In some embodiments of the present invention, the step, performed by the processor 61, of, if the Probe Request obtained by listening meets a preset activation condition, enabling the transmit channel includes:

if a Probe Request is detected, acquiring signal strength and/or a MAC address of the detected Probe Request; and if the MAC address is in preset authorized device information and/or the signal strength is greater than a preset strength threshold, enabling the transmit channel.

In some embodiments of the present invention, the processor 61 is further configured to perform:

configuring the authorized device information, where the authorized device information includes a list of MAC addresses of Stations allowed to wake up the wireless AP.

In some embodiments of the present invention, the processor 61 is further configured to perform:

configuring the preset time threshold, where the preset time threshold is equal to an integer (greater than 1) multiple of a beacon transmitting time interval of the wireless AP.

Figure 13:
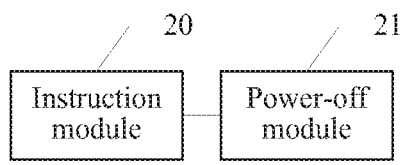
FIG. 13 is a schematic structural diagram of a wireless AP according to a fourth embodiment of the present invention.

Refer to FIG. 13, which is a schematic structural diagram of a wireless AP according to a fourth embodiment of the present invention. In this embodiment of the present invention, the wireless AP includes an instruction module 20 and a power-off module 21.

The instruction module 20 is configured to: when it is detected that a time during which no packet is transmitted uplink or downlink and no station is associated is greater than a preset time threshold, send a power-up instruction to a sniffer apparatus, where the power-up instruction is used to instruct the sniffer apparatus to power up.

The power-off module 21 is configured to cut off power.

This embodiment of the present invention belongs to a same idea as the method embodiment in FIG. 4, and technical effects brought by this embodiment of the present invention are also the same as those of the method embodiment in FIG. 4. For details, refer to the descriptions of the method embodiment in FIG. 4, which are not described herein again.

Figure 14:
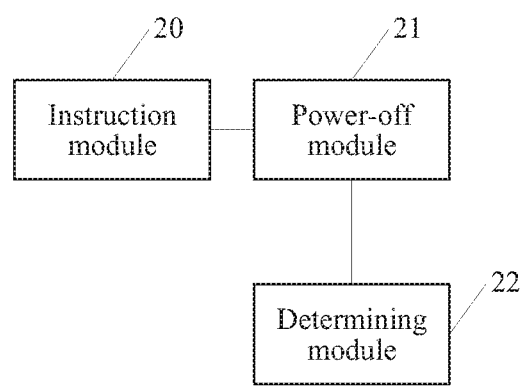
FIG. 14 is a schematic structural diagram of a wireless AP according to a fifth embodiment of the present invention.

Refer to FIG. 14, which is a schematic structural diagram of a wireless AP according to a fifth embodiment of the present invention. In this embodiment, besides including the instruction module 20 and the power-off module 21, the wireless AP further includes a determining module 22.

The determining module 22 is configured to: if a message for confirming that the sniffer apparatus is successfully power-up is received, instruct the power-off module to start to work.

This embodiment of the present invention belongs to a same idea as the method embodiment in FIG. 5, and technical effects brought by this embodiment of the present invention are also the same as those of the method embodiment in FIG. 5. For details, refer to the descriptions of the method embodiment in FIG. 5, which are not described herein again.

Figure 15:
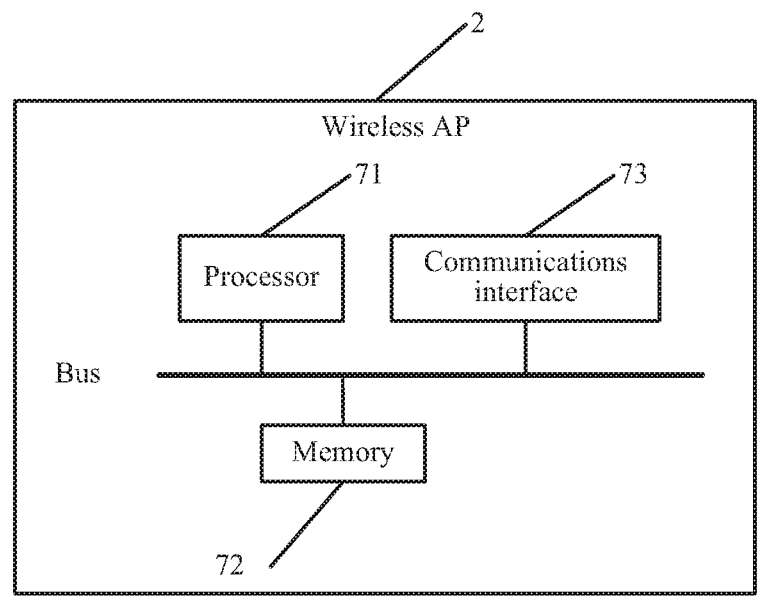
FIG. 15 is a schematic structural diagram of a wireless AP according to a sixth embodiment of the present invention.

Refer to FIG. 15, which is a schematic structural diagram of a wireless AP according to a sixth embodiment of the present invention. In this embodiment, the wireless AP 2 includes a processor 71, a memory 72, and a communications interface 73. The communications interface 73 is configured to communicate with an external device, there may be one or more processors 71 in the wireless AP 2, and an example of one processor is used in FIG. 15. In some embodiments of the present invention, the processor 71, the memory 72, and the communications interface 73 may be connected through a bus or in another manner, and an example in which the processor 71, the memory 72, and the communications interface 73 are connected through a bus is used in FIG. 15.

The memory 72 stores a set of program code, and the processor 71 is connected to invoke the program code stored in the memory 72, to perform the following operations:

when it is detected that a time during which no packet is transmitted uplink or downlink and no station is associated is greater than a preset time threshold, sending a power-up instruction to a sniffer apparatus, where the power-up instruction is used to instruct the sniffer apparatus to power up; and cutting off power.

In some embodiments of the present invention, the processor 71 is further configured to:

if a message for confirming that the sniffer apparatus is successfully power-up is received, perform the step of cutting off power.

Figure 16:
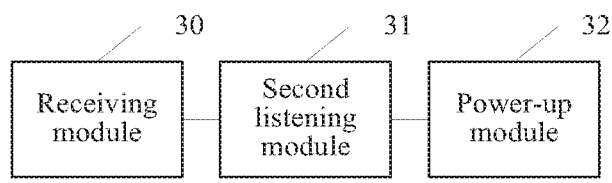
FIG. 16 is a schematic structural diagram of a sniffer apparatus according to a first embodiment of the present invention.

Refer to FIG. 16, which is a schematic structural diagram of a sniffer apparatus according to a first embodiment of the present invention. In this embodiment of the present invention, the sniffer apparatus includes a receiving module 30, a second listening module 31, and a power-up module 32.

The receiving module 30 is configured to: after a power-up instruction sent by a wireless AP is received, start powering up.

The second listening module 31 is configured to listen for a Probe Request.

The power-up module 32 is configured to: if the Probe Request obtained by listening meets a preset activation condition, after the wireless AP is instructed to power up, cut off power.

This embodiment of the present invention belongs to a same idea as the method embodiment in FIG. 6, and technical effects brought by this embodiment of the present invention are also the same as those of the method embodiment in FIG. 6. For details, refer to the descriptions of the method embodiment in FIG. 6, which are not described herein again.

Figure 17:
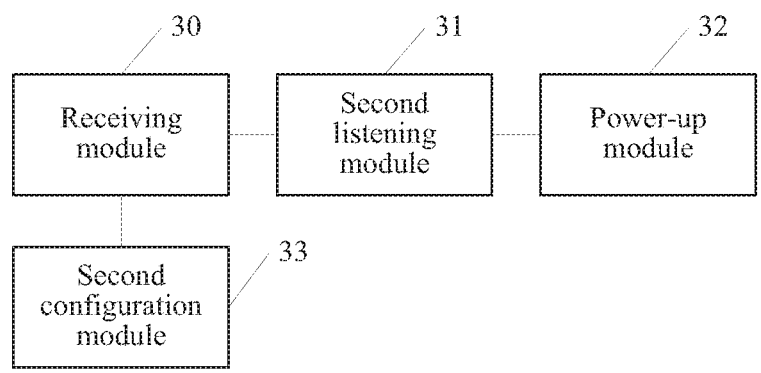
FIG. 17 is a schematic structural diagram of a sniffer apparatus according to a second embodiment of the present invention.
Figure 18:
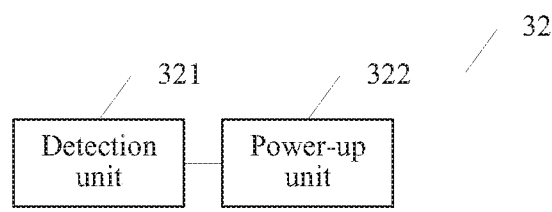
FIG. 18 is a schematic structural diagram of a power-up module in FIG. 17.

Refer to FIG. 17 and FIG. 18, which are schematic structural diagrams of a sniffer apparatus according to a second embodiment of the present invention. In this embodiment of the present invention, besides including a receiving module 30, a second listening module 31, and a power-up module 32, the sniffer apparatus further includes a second configuration module 33.

The second configuration module 33 is configured to configure authorized device information, where the authorized device information includes a list of MAC addresses of Stations allowed to wake up the wireless AP.

Optionally, the power-up module 32 is configured to: if a Probe Request is detected, after the wireless AP is instructed to power up, cut off power.

Optionally, the power-up module 32 includes a detection unit 321 and a power-up unit 322.

The detection unit 321 is configured to: if a Probe Request is detected, acquire signal strength and/or a MAC address of the detected Probe Request.

The power-up unit 322 is configured to: if the MAC address is in the preset authorized device information and/or the signal strength is greater than a preset strength threshold, after the wireless AP is instructed to power up, cut off power.

This embodiment of the present invention belongs to a same idea as the embodiments in FIG. 7 and FIG. 8, and technical effects brought by this embodiment of the present invention are also the same as those of the embodiments in FIG. 7 and FIG. 8. For details, refer to the descriptions of the embodiments in FIG. 7 and FIG. 8, which are not described herein again.

Figure 19:
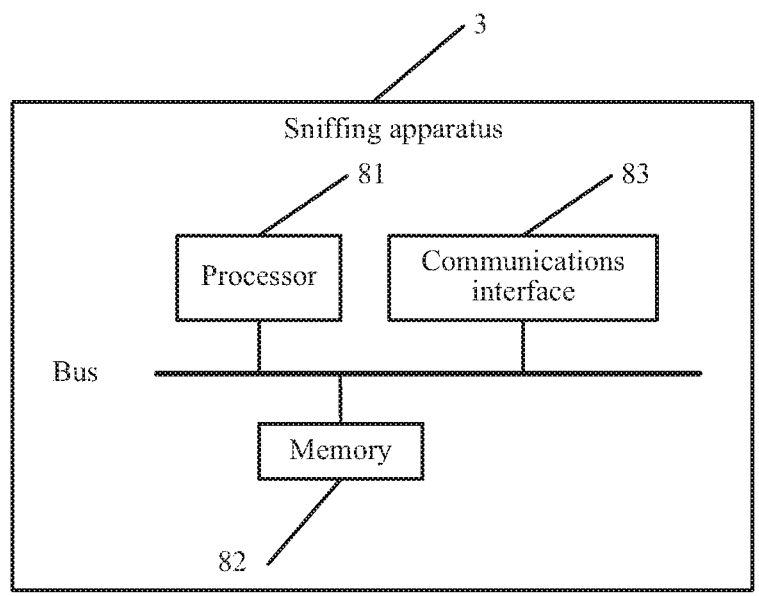
FIG. 19 is a schematic structural diagram of a sniffer apparatus according to a third embodiment of the present invention.

Refer to FIG. 19, which is a schematic structural diagram of a sniffer apparatus according to a third embodiment of the present invention. In this embodiment of the present invention, the sniffer apparatus 3 includes a processor 81, a memory 82, and a communications interface 83. The communications interface 83 is configured to communicate with an external device, there may be one or more processors 81 in the sniffer apparatus 3, and an example of one processor is used in FIG. 19. In some embodiments of the present invention, a processor 81, a memory 82, and a communications interface 83 may be connected through a bus or in another manner, and an example in which the processor 81, the memory 82, and the communications interface 83 are connected through a bus is used in FIG. 19.

The memory 82 stores a set of program code, and the processor 81 is connected to invoke the program code stored in the memory 82, to perform the following operations:

after a power-up instruction sent by a wireless AP is received, starting powering up;

listening for a Probe Request; and if the Probe Request obtained by listening meets a preset activation condition, after the wireless AP is instructed to power up, cutting off power.

In some embodiments of the present invention, the step, which the processor 81 is specifically configured to perform, of, if the Probe Request obtained by listening meets a preset activation condition, after the wireless AP is instructed to power up, cutting off power includes:

if a Probe Request is detected, after the wireless AP is instructed to power up, cutting off power.

In some embodiments of the present invention, the step, performed by the processor 81, of, if the Probe Request obtained by listening meets a preset activation condition, after the wireless AP is instructed to power up, cutting off power includes:

if a Probe Request is detected, acquiring signal strength and/or a MAC address of the detected Probe Request; and if the MAC address is in preset authorized device information and/or the signal strength is greater than a preset strength threshold, after the wireless AP is instructed to power up, cutting off power.

In some embodiments of the present invention, the processor 81 is further configured to: configure the authorized device information, where the authorized device information includes a list of MAC addresses of Stations allowed to wake up the wireless AP.

Figure 20:
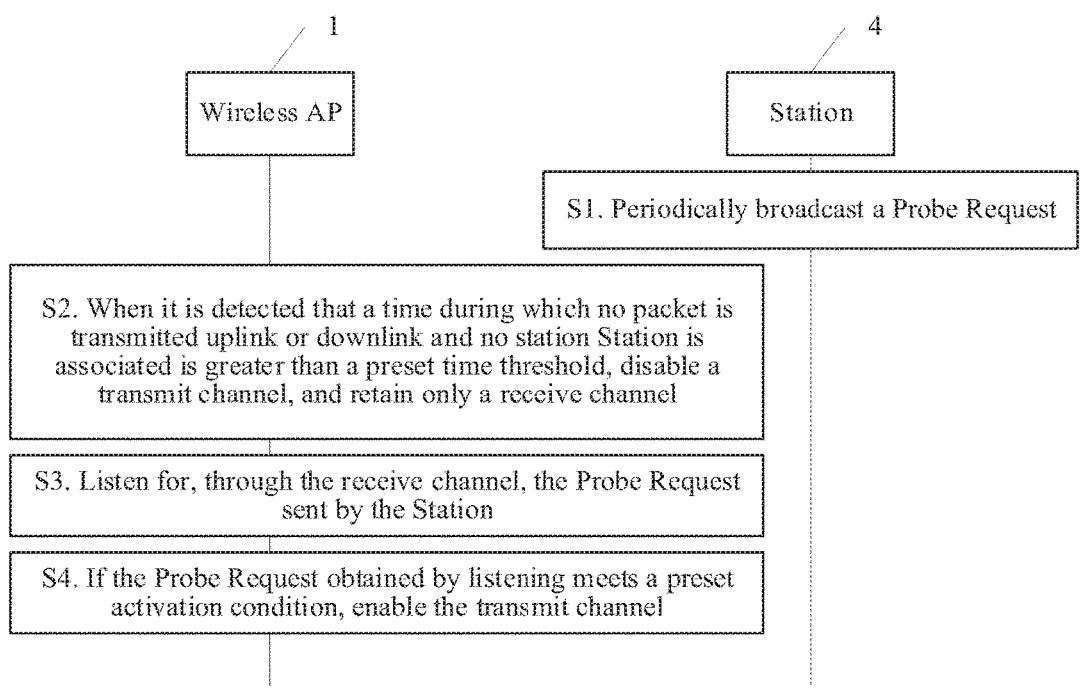
FIG. 20 is a schematic diagram of interaction of a communications system according to an embodiment of the present invention.

Refer to FIG. 20, which is a schematic diagram of interaction in a communications system according to an embodiment of the present invention. In this embodiment, the communications system includes a wireless AP and a Station, where a work procedure of the wireless AP 1 and the Station 4 is as follows:

S1: The Station periodically broadcasts a Probe Request.

S2: When detecting that a time during which no packet is transmitted uplink or downlink and no station is associated is greater than a preset time threshold, the wireless AP disables a transmit channel, and retains only a receive channel.

S3: The wireless AP listens to, through the receive channel, the Probe Request sent by the Station.

S4: If the Probe Request obtained by listening meets a preset activation condition, the wireless AP enables the transmit channel.

In implementation of this embodiment of the present invention, if a time during which no packet is transmitted uplink or downlink and no station is associated is greater than a preset time threshold, a wireless AP disables a transmit channel of the wireless AP, and retains only a receive channel, and the wireless AP enters a sleep state. The wireless AP determines, through the receive channel, that a Probe Request obtained by listening meets a preset activation condition, enables the transmit channel, and enters a normal state. In this way, power consumption of the wireless AP can be effectively reduced, and normal communication of the wireless AP is not affected.

Figure 21:
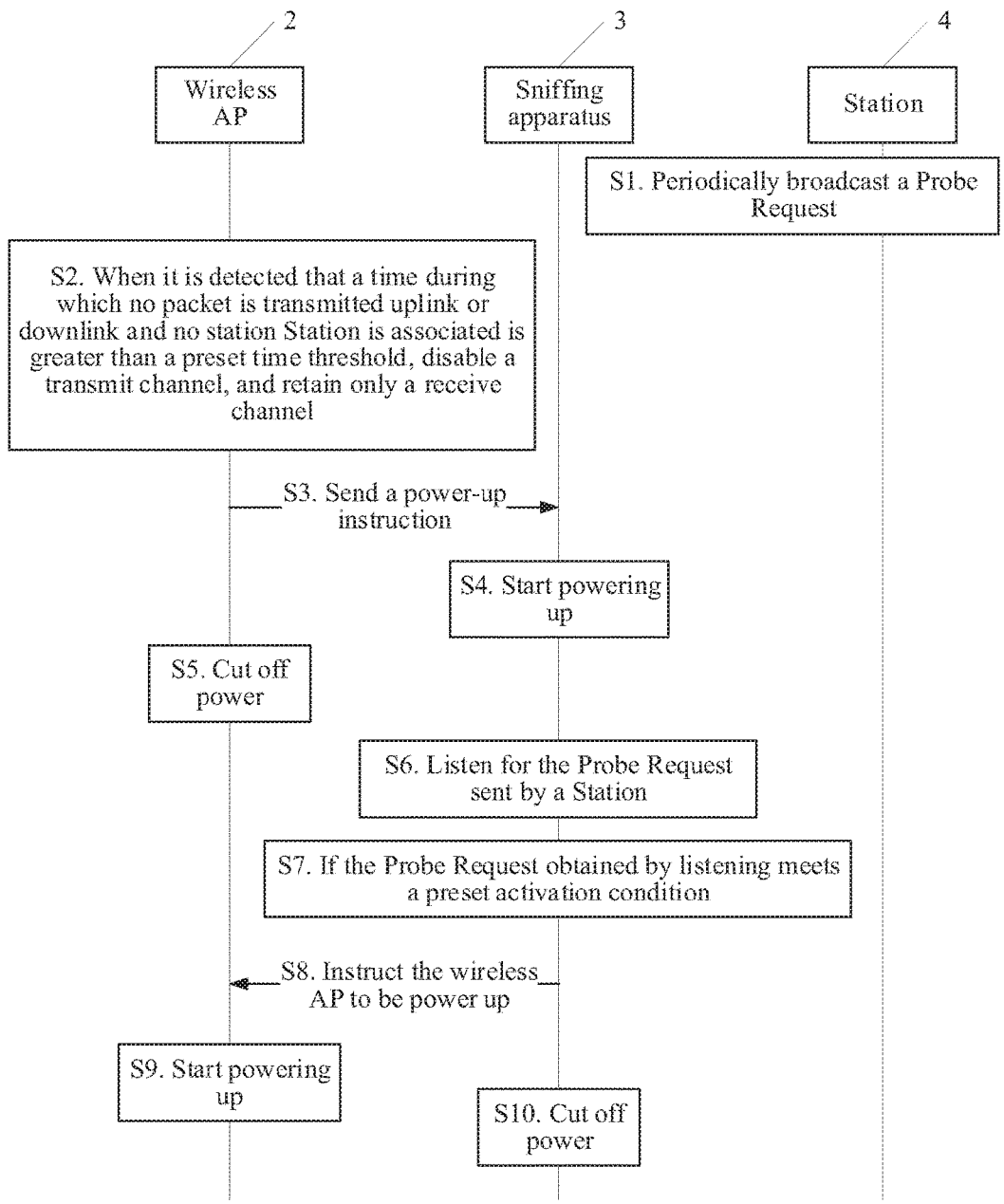
FIG. 21 is a schematic diagram of interaction of another communications system according to an embodiment of the present invention.

Refer to FIG. 21, which is a schematic diagram of interaction in another communications system according to an embodiment of the present invention. In this embodiment, the communications system includes a wireless AP 2, a sniffer apparatus 1, and a Station 3, where a work procedure of the wireless AP 2, the sniffer apparatus 1, and the Station 3 is as follows:

S1: The Station periodically broadcasts a Probe Request.

S2: The wireless AP detects that a time during which no packet is transmitted uplink or downlink and no station is associated is greater than a preset time threshold.

S3: The wireless AP sends a power-up instruction to the sniffer apparatus.

S4: After receiving the power-up instruction, the sniffer apparatus starts to power up.

S5: The wireless AP cuts off power.

S6: The sniffer apparatus listens to the Probe Request sent by the Station.

S7: If the Probe Request obtained by listening meets a preset activation condition.

S8: The sniffer apparatus instructs the wireless AP to power up.

S9: The wireless AP starts to power up.

S10: The sniffer apparatus cuts off power.

In the implementation of this embodiment of the present invention, when a wireless AP detects that a time during which no packet is transmitted uplink or downlink and no station is associated is greater than a preset time threshold, the wireless AP instructs a sniffer apparatus to start to perform a power-up operation, and cuts off power of the wireless AP. In this way, the wireless AP does not consume any electric power, and only the sniffer apparatus consumes electric power, so that power consumption can be greatly reduced.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (ROM), or a random access memory (RAM).

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A sniffer apparatus, comprising a processor and a memory, wherein the memory stores a set of program code, and the processor is configured to invoke the program code stored in the memory, to perform the following operations:
    after a power-up instruction sent by a wireless AP is received, starting powering up;
    listening for a Probe Request; and
    if the Probe Request obtained by listening meets a preset activation condition, after the wireless AP is instructed to power up, cutting off power.

2. The sniffer apparatus according to claim 1, wherein the step, which is performed by the processor, of, if the Probe Request obtained by listening meets a preset activation condition, after the wireless AP is instructed to power up, cutting off power comprises:
    if a Probe Request is detected, after the wireless AP is instructed to power up, cutting off power.

3. The sniffer apparatus according to claim 1, wherein the step, which is performed by the processor, of, if the Probe Request obtained by listening meets a preset activation condition, after the wireless AP is instructed to power up, cutting off power comprises:
    if a Probe Request is detected, acquiring signal strength and/or a MAC address of the detected Probe Request; and
    if the MAC address is in preset authorized device information and/or the signal strength is greater than a preset strength threshold, after the wireless AP is instructed to power up, cutting off power.

4. The sniffer apparatus according to claim 3, wherein the processor is further configured to:
    configure the authorized device information, wherein the authorized device information comprises a list of MAC addresses of Stations allowed to wake up the wireless AP.

5. A wakeup method for a wireless AP, wherein the method comprises:
    after a sniffer apparatus receives a power-up instruction sent by a wireless AP, starting powering up;
    listening for, by the sniffer apparatus, a Probe Request; and
    if the Probe Request obtained by listening meets a preset activation condition, after the sniffer apparatus instructs the wireless AP to power up, cutting off power.

6. The method according to claim 5, wherein the step of, if the Probe Request obtained by listening meets a preset activation condition, after the sniffer apparatus instructs the wireless AP to power up, cutting off power comprises:
    if the sniffer apparatus detects a Probe Request, after the sniffer apparatus instructs the wireless AP to power up, cutting off power.

7. The method according to claim 5, wherein the step of, if the Probe Request obtained by listening meets a preset activation condition, after the sniffer apparatus instructs the wireless AP to power up, cutting off power comprises:
- if the sniffer apparatus detects a Probe Request, acquiring signal strength and/or a MAC address of the detected Probe Request; and
- if the MAC address is in preset authorized device information and/or the signal strength is greater than a preset strength threshold, after the sniffer apparatus instructs the wireless AP to power up, cutting off power.

8. The method according to claim 7, before the step of, if the sniffer apparatus detects a Probe Request, acquiring signal strength and/or a MAC address of the detected Probe Request, further comprising:
- configuring the authorized device information, wherein the authorized device information comprises a list of MAC addresses of Stations allowed to wake up the wireless AP.

9. A communications system, comprising: a wireless AP, a sniffer apparatus, and a Station, wherein when it is detected that a time during which no packet is transmitted uplink or downlink and no Station is associated is greater than a preset time threshold, the wireless AP sends a power-up instruction to the sniffer apparatus, and the wireless AP cuts off power;
- after receiving a power-up instruction sent by the wireless AP, the sniffer apparatus starts to power up;
- the sniffer apparatus listens to a Probe Request broadcast by the Station according to a preset interval; and
- if the Probe Request obtained by listening meets a preset activation condition, after instructing the wireless AP to power up, the sniffer apparatus cuts off power.

* * * * *